UNITED STATES PATENT OFFICE 2,603,629

DIHYDROCARBON PEROXIDES CAPABLE OF CONTROLLING POLYMERIZATION REACTIONS

Herman S. Bloch, Chicago, Ill., assignor to Universal Oil Products Company, Chicago, Ill., a corporation of Delaware No Drawing. Application October 1, 1949, Serial No. 119,200

5 Claims. (Cl. 260—93.5)

This invention pertains to a process for polymerizing unsaturated organic compounds in the presence of an oxygen-containing compound derived from polyenic, cyclic hydrocarbons which is capable of initiating and accelerating the polymerization reaction in its initial stages and of controlling the reaction in the subsequent concluding stages of the polymerization. More specifically, the invention concerns a polymerization process involving unsaturated organic monomer starting material in which the polymerization is controlled by the presence of di-(polyenic, cyclopentenyl) peroxides in admixture with the reacting monomer or monomers and also compositions containing said unsaturated organic polymerizable compounds and said di-(polyenic, cyclopentenyl) peroxides.

It is commonly known that unsaturated organic compounds containing single or multiple unsaturated linkages may be polymerized with the aid of so-called catalytic or initiating agents of the type referred to as peroxidic compounds containing active oxygen groups which promote the polymerization reaction, especially in the initial stages of the polymerization reaction and, thus, effectively reduce the initial induction period in which the disappearance of reactive monomers from the reaction mixture and the formation of polymers proceeds at a slow and inefficient rate. Typical of such catalysts heretofore utilized in polymerization reactions are such compounds as benzoyl peroxide, di-tertiary butyl peroxide and, in aqueous systems, certain metallic salts of persulfuric acid. These peroxide type catalysts commonly employed by the art in many varied polymerization reactions exhibit certain deficiencies as wholly desirable polymerization catalysts in that they initiate the reaction chains by which the polymerization proceeds but have little influence on the concluding stages of the polymerization reaction when the reaction may proceed rapidly and result in the production of high molecular weight, solid products of the polymerization which may not be desirable. Furthermore, the above indicated peroxide compounds presently employed as catalysts are relatively unstable at temperatures above about 100° to 120° C., thus limiting their range of operability, and some may result in the production of undesirably colored resinous products. The di-(polyenic, cyclopentenyl) peroxides herein provided substantially overcome the above deficiencies, and in particular extend their influence beyond the initial stages of the polymerization reaction. In thus acting to accelerate the initial induction period common to many polymerization reactions but tempering the final stages of the polymerization to prevent the formation of undesirably high molecular weight polymers, the present peroxidic compounds are believed to occupy a unique position among catalysts of this type. This dual capacity action of the peroxides of this invention in promoting the polymerization reaction in the initial stages when the induction period is desirably reduced and, in effect, inhibiting the polymerization reaction rate during the final stages of the polymerization when the rate of polymer formation is desirably reduced to prevent the production of the less desirable high molecular weight polymers is believed to result from a change in the structure of the di-(polyenic cyclopentenyl) peroxides during the course of the reaction.

Accordingly, it is one object of this invention to provide a polymerization process employing an agent which enhances the polymerization in the initial stages and limits the size of the polymers formed in the concluding stages of the reaction. Another object of the invention is to provide new polymerizable compositions. Still another object of the invention is to provide a polymerization controlling agent which is soluble in polymerizable organic monomers, is substantially colorless, and does not result in the formation of colored polymeric products.

In one of its embodiments the present invention concerns a polymerization process which comprises polymerizing an unsaturated organic compound at polymerization reaction conditions in the presence of a polymerization control agent comprising a di-(polyenic cyclopentenyl hydrocarbon) peroxide formed by the controlled oxidation of a polyolefinic cyclic conjunct polymer hydrocarbon.

A more specific embodiment of the invention concerns a polymerization process which comprises polymerizing an unsaturated organic compound at polymerization reaction conditions in the presence of from about 0.001 to about 5% by weight of the reaction mixture of a polymerization control agent comprising a peroxide formed by aeration of a mixture of polyolefinic cyclic conjunct polymer hydrocarbons at controlled oxidation conditions.

Another specific embodiment of the invention relates to a composition consisting of a mixture of at least one polymerizable unsaturated organic compound and from about 0.001 to about 5% by weight of said mixture of a polymerization control agent comprising a di-(polyenic cyclopentenyl hydrocarbon) peroxide formed by the controlled oxidation of a polyolefinic, cyclic conjunct polymer hydrocarbon.

The polymerization control agents utilized in the present polymerization process and characterized herein as the product formed by the controlled oxidation of a mixture of polyolefinic cyclic conjunct polymer hydrocarbons containing peroxidic oxygen comprises a mixture of chemical individuals having the general formula:

R—O—O—R wherein R, representing that portion of the peroxide molecule on either end of the peroxidic oxygen bridge, is a hydrocarbon radical having the structure and composition of the original conjunct polymer hydrocarbons subjected to oxidation less a hydrogen atom of an alkyl or alkenyl side chain of the cyclopentenyl nucleus present in the hydrocarbons contained in the mixture of conjunct polymers. The peroxidic compound contained in the mixture of oxidized conjunct polymer hydrocarbons may be represented more specifically by the formulas:

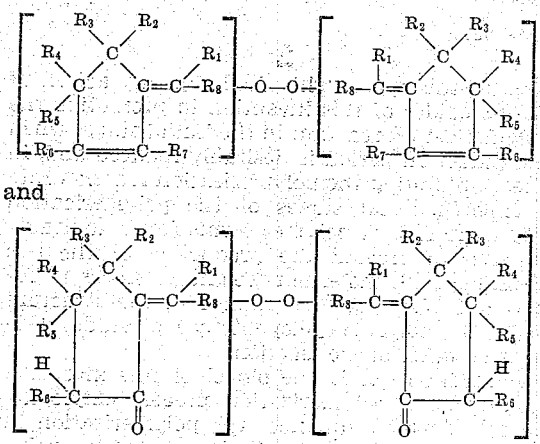

and where the radicals $R_1$ to $R_8$ are selected from the group consisting of hydrogen and alkyl, alkylene, alkenyl, alkenylene, alkapolyenyl and alkapolyenylene hydrocarbon radicals, at least two of the substituents $R_2$ to $R_7$ are hydrocarbon radicals, not more than two of the groups $R_1$, $R_6$ and $R_7$ represent hydrogen radicals, and one R group in each radical is selected from the group consisting of alkylene, alkenylene, and alkapolyenylene. The above formula containing ketonic oxygen groups is believed to be representative of the general type of compounds obtained upon deep-seated or prolonged oxidation of the polyolefinic cyclic conjunct polymer hydrocarbons and are likewise believed to take part in directing the course of the polymerization reaction by virtue of the peroxidic oxygen groups within the compound.

The hydrocarbon starting materials which may be oxidized under controlled conditions to form the novel peroxide derivatives thereof hereinabove noted, are referred to as unsaturated conjunct polymers having a polyolefinic, cyclic structure, the properties, structure and methods for the preparation of which are described in U. S. Patents Nos. 2,413,316, 2,477,038, and 2,476,955. Briefly, these hydrocarbons, capable of oxidation to form the specific peroxidic oxygen containing polymerization catalysts herein provided are formed by the reaction of a conjunct polymerization catalyst with an unsaturated aliphatic or cyclic hydrocarbon or saturated, branched chain aliphatic hydrocarbon, the reaction being effected at temperatures of from about 0° to about 200° C. whereby a sludge-like product is formed as one product of the reaction, from which the unsaturated conjunct polymers are recovered by special methods of decomposition. The unsaturated conjunct polymers recovered from the sludge comprise a mixture of homologous hydrocarbons having the following general structure in which the individual components vary in molecular weight and the length of the side chains attached to the cyclopentenyl nucleus vary among the individual components of the mixture of conjunct polymers:

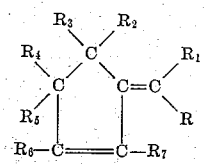

wherein radicals R and $R_1$ to $R_7$ are selected from the group consisting of hydrogen, alkyl, alkenyl and alkapolyenyl hydrocarbon radicals and at least two of the substituents $R_3$ to $R_7$ are hydrocarbon radicals, and not more than two of the groups R, $R_1$, $R_2$, and $R_7$ represent hydrogen. Individual components in the mixture of unsaturated conjunct polymers vary as to the number of hydrogen, alkyl, alkenyl and alkapolyenyl groups attached to the cyclopentenyl nucleus, but in general, the cyclopentenyl nucleus is common to all of the hydrocarbons in the lower-boiling fractions of the mixture, some of the higher boiling components containing dicyclic nuclei. The components of the mixture of unsaturated conjunct polymers vary in molecular weight from as low as about 250 to as high as about 450, the highest boiling fractions of which have molecular weights as high as 1000, and contain from about 2.5 to about 4 double bonds per molecule of which an average of from about 1.5 to about 2.5 belong to a conjugated dienic system and the remaining olefinic linkages are distributed throughout the hydrocarbon chains in isolated positions.

The di-(polyenic cyclic hydrocarbon) peroxides employed as polymerization control agents in the present process for the polymerization of unsaturated organic compounds may be produced by several alternative procedures, a particularly advantageous method of production comprising oxidation of the unsaturated conjunct polymers by means of a controlled, non-explosive, thermal or catalytic oxidation, preferably employing relatively high pressures in the oxidation reactor within specific temperature limitations to prevent the formation of deep seated oxidation products which may be formed when the oxidation reaction is allowed to proceed uncontrolled.

Suitable catalysts for hastening the oxidation of the unsaturated conjunct polymers to form the polymerization control agents herein provided are the hydrohalides of the halogens, that is, hydrogen fluoride, hydrogen chloride and hydrogen bromide, or a small amount, up to about 10% by weight of the hydrocarbons charged, of a previously oxidized mixture of unsaturated conjunct polymers, the presence of a catalyst in the reaction mixture generally reducing or eliminating the so-called induction period in which no appreciable reaction of the hydrocarbons and oxygen occurs. The oxidation may be effected at atmospheric pressure by bubbling an oxygen-containing gas, such as air or pure oxygen itself through a column of the unsaturated conjunct polymers or at superatmospheric pressures by pressurizing the oxygen-containing gas in a stirred pressure autoclave containing the hydrocarbon charge. It is found that oxidation of the unsaturated conjunct polymers proceeds at temperatures even below 0° C., (slowly, however), to form the di-(polyenic, cyclic hydrocarbon) peroxides while 200° C. is generally the upper temperature limitation to obtain the desired controlled oxidation of the unsaturated conjunct polymers and the formation of the present peroxides; at higher temperatures, degradation occurs. A suitable diluent may be added to the mixture of unsaturated conjunct polymers prior to oxidation to provide greater control over the reaction, such diluents generally comprising the saturated hydrocarbons and halogenated hydrocarbons, preferably a relatively volatile n-paraffin which may be removed from the oxidation reaction mixture at low temperatures following the oxidation.

One of the preferred methods of preparing the di-(polyenic cyclic hydrocarbon) peroxides comprises heating a mixture of gaseous oxygen and the unsaturated conjunct polymer hydrocarbon reactant at a pressure of from about 2 to about 30 atmospheres and at a temperature of from about 50° to about 150° C. in the presence of about 5% by weight of the reaction mixture of the peroxides formed in a prior oxidation of the unsaturated conjunct polymer hydrocarbon. The oxidation may be effected in any suitable reactor, preferably a closed reactor such as a pressure autoclave while providing a suitable means for stirring the contents of the reactor, as for example, by rotating the autoclave. The oxidation of the hydrocarbons to the desired degree of oxidation by the above pressurized reaction is generally complete within a period of from about ½ to about 4 hours, although the reaction may be interrupted at any stage of completion depending upon the degree of oxidation desired.

Another suitable method for the preparation of the present peroxides utilizable as polymerization control agents in the aforementioned oxidation method comprises bubbling an oxygen-containing gas such as air, or pure oxygen, into a mixture of the unsaturated conjunct polymers for a reaction period suitable to obtain the desired degree of oxidation. The oxygen-containing gas is desirably introduced into the hydrocarbon charge contained in an elongated vertical column and preferably into the bottom of said column, permitting the gas bubbles to rise through the column in contact with the hydrocarbons. The rate of oxidation may be increased by extending the height of the column and reducing the size of the bubbles thereby increasing the time and area of contact of the oxygen containing gas with the hydrocarbon charge. When effected at room temperature or below, the latter method produces a suitable mixture of peroxides in a period of time of from about 24 hours to about 10 days. Distillation, extraction, or other methods of removal may be employed to separate the excess reactant hydrocarbons or inert diluent from the oxidation reaction mixture.

Polymerizable monomers which may be utilized as charging stocks, in the present polymerization reaction, catalyzed by the aforementioned di-(polyenic cyclic hydrocarbon) peroxides are characterized as unsaturated organic compounds, wherein the unsaturation is of the olefinic, polyolefinic, or acetylenic type. Polymerization, as referred to herein includes not only simple polymerization between monomers of the same structure and composition, but also includes heteropolymerization or co-polymerization between two or more diverse polymerizable monomers. Polymerization is effected by admixing or dissolving from about 0.001 to about 5% by weight of the polymerizable monomers of the present di-(polyenic cyclic hydrocarbon) peroxide into a mixture of the monomers and heating the resulting mixture to a temperature of from about 50° to about 200° C., and preferably from about 70° to about 120° C.

The many organic compounds recognized by the art as polymerizable monomers may be each independently and in admixture utilized as charging stock in the present polymerization process. Of the classes of compounds represented as unsaturated polymerizable monomers, perhaps the largest single class of compounds readily subject to peroxide catalyzed polymerization are the organic compounds containing mono-olefinic unsaturation such as vinyl alcohol esters, the vinyl halides, the vinyl aromatic compounds such as styrene and alphamethyl styrene, vinyl ethers, vinyl ketones, and other vinyl derivatives; the corresponding allyl compounds, derivatives of acrylic acid, such as acrylonitrile, and its many saturated and unsaturated alcohol esters; and alpha-substituted acrylic acid derivatives; the mono-olefinic hydrocarbons, such as ethylene, propylene, butylene, etc.; cyclic unsaturates such as inden or coumarone; and other compounds, within the general class of mono-olefinic unsaturated organic compounds.

Another large and important class of polymerizable compounds utilizable as starting materials in the present polymerization process are the compounds containing polyenic unsaturation. The unsaturated bonds of the polyenes are desirably of the conjugated or of the mixed conjugated and non-conjugated variety. Compounds containing polyolefinic unsaturation selected for polymer formation in the production of resins, drying oils, etc., are generally hydrocarbons, but may also contain other substituents such as halogen, amino, nitro, carboxyl, carbonyl, and ester groups, yielding polymers of diverse properties. Representative compounds within the latter class of polymerizable monomers comprise the polyenic hydrocarbons such as butadiene-1,3, isoprene, cyclopentadiene, divinylbenzene, the halogen substituted dienes such as 2-chloro-butadiene-1,3, and compounds of similar structure. When copolymerized with other unsaturated monomers, such as styrene, isobutylene, etc., the dienes, and especially the conjugated dienes, yield elastomeric products generally characterized as synthetic rubbers.

Still other unsaturated organic compounds polymerizable by means of the present di-(polyenic cyclic hydrocarbon) peroxides include the unsaturated aliphatic alcohol and unsaturated aliphatic acid inter-esters or the esters of saturated aliphatic alcohols and acids and unsaturated alcohols and acids and the unsaturated alcohol ethers of saturated or unsaturated alcohols. Typical of such compounds are the glyceride fatty acid esters, such as glycerol mono-, di-, and trilinolenate and others. These organic compounds may also contain other diverse groups, such as amino, nitro, halogen, sulfate, phosphate, and other groups which in themselves do not affect the polymerization reaction, but introduce modifications in the physical and chemical properties of the resulting polymeric products, such as their solubility in various solvents, their melting points, and their reactivity with other reagents.

The present peroxide catalysts are utilizable in any of the various systems of polymerization utilized in the art; that is, in bulk polymerization, wherein one or more of the monomers is admixed with the peroxide polymerization catalyst and thereafter heated to the desired temperature and pressure conditions to effect polymerization thereof and in which system other agents which affect the polymerization such as acids or bases may also be present; emulsion polymerization wherein the monomers are emulsified with the catalyst in the presence of water or some other immiscible suspending phase usually with the aid of a suitable surface active agent, such as a synthetic detergent, soap, or other dispersing or wetting agent; and suspension polymerization wherein the monomers are suspended as minute droplets in immiscible or partially immiscible liquid suspending media, together with the present peroxide polymerization catalyst.

The initial polymerization may be interrupted at any intermediate stage of completion, if desired, and the product thereof transferred to a mold, together with additional monomer or monomers, if desired, there completing the polymerization to form the product in the desired shape. Since the present peroxide catalyst tends to reduce the rate of polymerization in the concluding or final stages of the reaction, thereby controlling the rate in the normally rapid concluding stage, when desired to hasten the completion of the reaction, an additional quantity of the peroxide catalyst or of a different peroxide such as benzoyl peroxide, acetyl peroxide, di-tert-butyl peroxide, ammonium persulfate, etc., may be added to the reaction mixture to complete the polymerization expeditiously, or a mixture of such peroxides with the present peroxide may be used initially. However, the tempering effect which the present peroxide catalyst has on the polymerization reaction in its final stages is in many cases, a distinct advantage as it tends to regulate the polymerization reaction in its concluding stages, thus reducing or eliminating the production of excessively hard or brittle products.

The products of the polymerization reaction will range in physical properties from viscous oils to plastic solid masses, hard brittle resins, elastomeric rubber-like materials, or tough resinous products, depending upon the choice of conditions of polymerizations, the type and relative proportions of monomers charged and the method of effecting the polymerization, that is, whether by the emulsion, bulk or suspension type of polymerization process. The elastomeric types of products may be used as rubber substitutes and as molding compositions, the resinous products as ingredients of coating compositions, adhesives, molding compositions, etc., while the plastic products are utilizable as such for variously shaped articles. Other materials may be incorporated into the polymerization reaction mixture or into the product ultimately formed to vary the physical appearance or physical properties of the product, such as antioxidants, oils, pigments, etc.

The procedure utilized for the preparation of the present peroxide catalyst and for its use in the polymerization of organic unsaturated compounds, the reactants charged into these processes and other variables of the present process are further illustrated in the following examples, which, however, are not intended to limit the scope of the present process in accordance with the specific conditions and reactants specified therein.

Example I

A mixture of polyolefinic, cyclic hydrocarbons or unsaturated conjunct polymers comprising the charging stock for the preparation of the present polymerization control agent was prepared by means of the so-called "conjunct polymerization reaction" involving substantially anhydrous hydrogen fluoride as catalyst for the reaction and a mixture of mono-olefinic hydrocarbons formed by the simple polymerization of a mixture of butylenes and propylene, the polymer charged to the conjunct polymerization reaction containing an average of from about 8 to about 10 carbon atoms per molecule. A conjunct polymerization was effected by mixing the olefinic hydrocarbons and hydrogen fluoride in liquid form at a temperature of about 90° C. and at a pressure of about 200 p. s. i. to maintain the reactants in substantially liquid phase during the conjunct polymerization reaction. Following completion of the conjunct polymerization reaction, after a reaction period of about one hour, the mixture separated into two layers. The lower layer containing substantially all of the hydrogen fluoride originally charged to the reaction was decanted from an upper hydrocarbon phase and was thereafter mixed with ice and water to effect hydrolysis of the conjunct polymer hydrocarbon-hydrogen fluoride complexes contained in the sludge. The desired hydrocarbon product separating from the aqueous hydrofluoric acid phase was separated therefrom and reserved as the unsaturated conjunct polymer charging stock in the preparation of the present polymerization catalyst by oxidation, as hereinafter described.

It consisted of a mixture of hydrocarbons having a boiling range of from about 160° to over 400° C., a density of 0.863 at 20° C., a refractive index of 1.4871, a diene number of 85, a bromide number of 195 and contained an average of about 3.2 double bonds per molecule, based upon an average molecular weight of the hydrocarbons in the mixture of about 310.

Approximately 250 cc. of the mixture of unsaturated conjunct polymers was charged into a vertical glass column of approximately 32 mm. in diameter and 18" in height. A stream of dry air was introduced into the bottom of the column containing the unsaturated conjunct polymers through a fritted glass plate for a period of 120 hours at room temperature (approximately 30° C.). The oxidation product was a highly viscous oil having practically no color, and upon analysis for oxygen, hydrogen, and carbon, contained approximately one mole of oxygen ($O_2$) per mole of unsaturated conjunct polymer charged. The oxidation generally ceased after about 120 hours as indicated by no further increase in viscosity, color or temperature of the reaction mixture, although further oxidation was attempted by continued bubbling of air into the reaction mixture. Analysis of the product indicated that it contained 79.2% carbon, 11.3% hydrogen, and 9.5% oxygen, by difference. Its molecular weight was slightly over twice that of the charged hydrocarbon oil.

When analyzed for peroxidic oxygen content by the titanous chloride titration method, it was found that approximately 5% of the oxygen in the product was of the non-di-tertiary alkyl peroxide type while infrared and ultra violet absorption spectrographic methods of analysis indicated that approximately 50% of the oxygen in the product appeared therein as di-tertiary alkyl peroxides, a strong spectral band also appearing for ketonic oxygen. Hydrogenation of the oxidized product (by passage of the product over a nickel catalyst in the presence of hydrogen) produced a saturated cyclic product corresponding in structure to hydrogenated polyolefinic, cyclic conjunct polymer hydrocarbons, thus indicating that an oxygen linkage (rather than a carbon-carbon linkage) occurs between molecules of the original unsaturated conjunct polymer hydrocarbons charged.

*Example II*

A mixture of unsaturated conjunct polymers similar to that employed in Example I above and an equivalent volume of pentane in which the unsaturated conjunct polymers dissolve was charged into a pressure autoclave with oxygen at 45 lbs. p. s. i. g. and stirred at 25° C. until oxygen absorption by the hydrocarbon mixture ceased, at the end of about 80 hours of contact. The oxidation product again contained approximately 1 mole of oxygen per mole of unsaturated conjunct polymer charged and upon analysis had an oxygen content of approximately 10%. This product likewise contained approximately 5% of the oxygen contained therein as non-di-tertiary alkyl peroxide by the titanous chloride titration method and approximately 50% of the oxygen as di-tertiary alkyl peroxide by the spectrographic method of analysis.

*Example III*

Although oxidation of unsaturated conjunct polymer hydrocarbons generally ceased or proceeded at a greatly retarded rate after the addition of approximately one mole of oxygen per mole of said unsaturated polymer in the absence of extraneous catalytic effects, further oxidation could be obtained by contacting the unsaturated conjunct polymers with oxygen in the presence of a hydrogen halide, such as hydrogen fluoride or by irradiation with ultra violet light.

The product obtained with the aid of a hydrogen halide or irradiation may contain up to about 2 moles of oxygen per mole of unsaturated conjunct polymer, a much higher proportion of the oxygen appearing as ketonic oxygen than the product obtained upon oxidation in the absence of hydrogen halide or ultra violet radiation. Furthermore, deep-seated oxidation products begin to appear after the absorption of 1 mole of oxygen per mole of unsaturated conjunct polymer, such as carbon dioxide, carbon monoxide, and low molecular weight acids, ketones, and alcohols.

The ability of the peroxidic compound prepared by the oxidation of the unsaturated conjunct polymers to control the polymerization of an unsaturated monomer is shown in the following Example IV wherein the oxidation product prepared as in Example I above, (that is, the oxidized unsaturated conjunct polymer prepared by aeration of the hydrocarbons) is utilized to control the polymerization of styrene.

*Example IV*

Two series of styrene samples, each of which was approximately 10 cc. in volume, one series consisting of uncatalyzed styrene and the other consisting of styrene containing 0.75% by weight of the peroxide polymerization control agent prepared as in Example I above, were placed in glass tubes approximately 13 centimeters long and 15 mm. in diameter. Each series of tubes (that is, the control samples consisting of only styrene and the samples consisting of styrene and 0.75% by weight of the unsaturated conjunct polymer hydrocarbon peroxide) was uniformly heated in pairs in a constant temperature bath, one pair at 25° C., a second pair at 38° C., a third pair at 71° C., and a fourth pair at 100° C. The extent of polymerization was determined in each pair of samples by measurement of the viscosity of the styrene in each of the control and sample tubes, the relative viscosity of the control and test samples being compared by the bubble time for each pair of tubes at the same polymerization temperature. It was found that at 25° and at 38° C., the unsaturated conjunct polymer peroxides markedly increased the rate of polymerization of the styrene in the test samples, whereas at 71° C. and at 100° C. the initial rates of polymerization were about the same for the catalyzed and the uncatalyzed mixtures. It is apparent that as the rate of thermal polymerization becomes high (i. e. at the higher temperatures) the peroxide induced reaction becomes of relatively small significance as a factor in determining the overall polymerization rate. On the other hand, at the lower temperatures, at which the rate of thermal polymerization is low, the peroxide-induced polymerization accounts for the bulk of the reaction in the initial stages.

At all four temperatures, as the reaction proceeded, a time was reached at which the rate of the uncatalyzed reaction began to exceed that of the peroxide-catalyzed reaction. This time was about 300 hours at 25° C., about 100 hours at 38° C., about 20 hours at 71° and about 2 hours at 100° C. At these points, at which the over-all rate of polymerization became high at all four temperatures, the regulating effect of the present peroxides became manifest. Either by the effect of some materials originally present in the air-blown conjunct polymers or because of some materials formed in the decomposition of the peroxides, a mild chain-breaking effect is exerted which prevents the peroxide-induced reaction, in its later stages, from reaching the high and uncontrollable velocity of the uncatalyzed reaction of a polymerization induced by conventional peroxides. This mild inhibiting effect, which, like the initial catalyzing effect, is more pronounced at the lower than at the higher temperatures, permits easy control of the reaction in its later stages and makes possible the consistent recovery of polymer in intermediate stages of polymerization which could normally be obtained only with great difficulty.

Although I have shown the present peroxides to be useful mainly for inducing the polymerization of unsaturates, it is apparent that they may be used for other peroxides induced reactions as well, such as the addition of saturated alkyl polyhalides to olefines, the condensation of acetic acid or its derivatives to the corresponding succinic compounds, the condensation of toluene to dibenzyl, and the like.

I claim as my invention:

1. A polymerization control agent comprising a peroxide of a hydrocarbon having the following general structure:

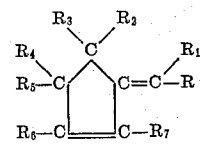

wherein R and $R_1$ to $R_7$ are selected from the group consisting of hydrogen, alkyl, alkenyl and alkapolyenyl hydrocarbon radicals, at least two of the groups $R_3$ to $R_7$ being hydrocarbon radicals and not more than two of the groups R, $R_1$, $R_2$ and $R_7$ being hydrogen, said hydrocarbon having a molecular weight of from about 250 to about 1000 and containing from about 2.5 to about 4 double bonds per molecule of which an average of from about 1.5 to about 2.5 belong to a conjugated dienic system and the remaining olefinic linkages are distributed throughout the hydrocarbon chains in isolated positions.

2. A process for the polymerization of an unsaturated polymerizable organic compound selected from the group consisting of compounds containing ethylenic unsaturation and compounds containing acetylenic unsaturation, which comprises subjecting said compound to polymerization reaction conditions in the presence of a polymerization control agent comprising a peroxide of a hydrocarbon having the following general structure:

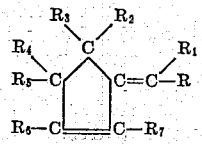

wherein R and $R_1$ to $R_7$ are selected from the group consisting of hydrogen, alkyl, alkenyl and alkapolyenyl hydrocarbon radicals, at least two of the groups $R_3$ to $R_7$ being hydrocarbon radicals and not more than two of the groups R, $R_1$, $R_2$ and $R_7$ being hydrogen, said hydrocarbon having a molecular weight of from about 250 to about 1000 and containing from about 2.5 to about 4 double bonds per molecule of which an average of from about 1.5 to about 2.5 belong to a conjugated dienic system and the remaining olefinic linkages are distributed throughout the hydrocarbon chains in isolated positions.

3. The process of claim 2 further characterized in that said unsaturated polymerizable organic compound is subjected to polymerization at a temperature less than about 120° C.

4. The process of claim 2 further characterized in that said polymerizable organic compound contains ethylenic unsaturation.

5. The process of claim 2 further characterized in that said polymerizable organic compound is styrene.

HERMAN S. BLOCH.

REFERENCES CITED

The following references are of record in the file of this patent:

UNITED STATES PATENTS

| Number | Name | Date |
|---|---|---|
| 1,683,404 | Ostromislensky | Sept. 4, 1928 |
| 2,430,864 | Farkas | Nov. 18, 1947 |
| 2,447,794 | Brewer | Aug. 24, 1948 |
| 2,472,152 | Farkas | June 7, 1949 |